US007882371B2

(12) United States Patent
Yano

(10) Patent No.: US 7,882,371 B2
(45) Date of Patent: Feb. 1, 2011

(54) POWER SUPPLY UNIT AND IMAGE FORMING APPARATUS

(75) Inventor: Tetsuya Yano, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 810 days.

(21) Appl. No.: 11/679,522

(22) Filed: Feb. 27, 2007

(65) Prior Publication Data

US 2007/0212102 A1 Sep. 13, 2007

(30) Foreign Application Priority Data

Mar. 3, 2006 (JP) ............................ 2006-057606

(51) Int. Cl.
*G06F 1/00* (2006.01)
*G03G 15/00* (2006.01)

(52) U.S. Cl. ........................................ 713/300; 399/88

(58) Field of Classification Search ................ 219/200; 713/300; 399/88
See application file for complete search history.

(56) References Cited

U.S. PATENT DOCUMENTS

| | | | | |
|---|---|---|---|---|
| 5,621,630 | A * | 4/1997 | Suzuki et al. | 363/71 |
| 6,433,981 | B1 * | 8/2002 | Fletcher et al. | 361/93.1 |
| 6,542,705 | B2 | 4/2003 | Fujita et al. | |
| 7,002,112 | B2 | 2/2006 | Kishi et al. | |
| 7,054,570 | B2 | 5/2006 | Kishi et al. | |
| 7,071,668 | B2 * | 7/2006 | Sasaki | 323/290 |
| 7,116,923 | B2 | 10/2006 | Kishi et al. | |
| 7,130,555 | B2 | 10/2006 | Kishi et al. | |
| 7,170,194 | B2 * | 1/2007 | Korcharz et al. | 307/21 |
| 2004/0245235 | A1 | 12/2004 | Kishi et al. | |
| 2004/0245241 | A1 | 12/2004 | Kishi et al. | |
| 2005/0123315 | A1 | 6/2005 | Kishi et al. | |
| 2005/0139584 | A1 | 6/2005 | Kishi et al. | |
| 2005/0175368 | A1 | 8/2005 | Matsusaka et al. | |
| 2005/0175370 | A1 | 8/2005 | Matsusaka et al. | |
| 2005/0191078 | A1 | 9/2005 | Kishi et al. | |
| 2005/0270816 | A1 * | 12/2005 | Nielsen | 363/142 |

(Continued)

FOREIGN PATENT DOCUMENTS

JP 2004-236492 8/2004

(Continued)

OTHER PUBLICATIONS

U.S. Appl. No. 11/678,854, filed Feb. 26, 2007, Yano, et al.

*Primary Examiner*—Thomas Lee
*Assistant Examiner*—Brandon Kinsey
(74) *Attorney, Agent, or Firm*—Oblon, Spivak, McClelland, Maier & Neustadt, L.L.P.

(57) ABSTRACT

A first power supply of a constant-voltage output supplies a power to a load by using an external power. A signal generating unit generates a control signal for compensating a shortfall of a load current when exceeding an upper limit of an output current of the first power supply. A second power supply of a constant-current output supplies a power to the load based on the control signal by using a power from a capacitor. An output voltage of the first power supply is controlled so that a voltage of a power supply line that is closer to the load than a current detection position of a converting unit that converts the load current into a current signal is made constant.

15 Claims, 11 Drawing Sheets

U.S. PATENT DOCUMENTS

| | | | | |
|---|---|---|---|---|
| 2006/0039713 | A1 | 2/2006 | Kishi et al. | |
| 2006/0051111 | A1 | 3/2006 | Kishi et al. | |
| 2006/0051112 | A1 | 3/2006 | Matsusaka et al. | |
| 2006/0051113 | A1 | 3/2006 | Kishi et al. | |
| 2006/0051119 | A1 | 3/2006 | Kishi et al. | |
| 2006/0051120 | A1 | 3/2006 | Kishi et al. | |
| 2006/0051121 | A1 | 3/2006 | Matsusaka et al. | |
| 2006/0127118 | A1 | 6/2006 | Kishi et al. | |
| 2006/0237446 | A1 | 10/2006 | Kishi et al. | |
| 2007/0114849 | A1 * | 5/2007 | Falik et al. | 307/64 |
| 2007/0194759 | A1 * | 8/2007 | Shimizu et al. | 320/166 |

FOREIGN PATENT DOCUMENTS

| | | |
|---|---|---|
| JP | 2005-221674 | 8/2005 |
| JP | 2007-143340 | 6/2007 |

* cited by examiner

POWER SUPPLY UNIT AND IMAGE FORMING APPARATUS

CROSS-REFERENCE TO RELATED APPLICATIONS

The present document incorporates by reference the entire contents of Japanese priority document, 2006-057606 filed in Japan on Mar. 3, 2006.

BACKGROUND OF THE INVENTION

1. Field of the Invention

The present invention relates to a power supply unit that includes an auxiliary power supply in addition to a main power supply.

2. Description of the Related Art

In recent years, copiers using an electrophotographic process, printers, facsimile machines, and multifunction products (MFPs) combining a copier, a printer, and a facsimile machine have become multifunctional. Accompanying the increasing multifunctionality, the copiers, the printers, the facsimile machines, and the MFPs have increasingly complex structures and larger maximum power consumption. In addition, amount of power supplied to a fixing heater is increased to reduce wait-time required by an operator and contributing factors from an image forming apparatus itself, such as wait-time required until a fixing device starts and temporary termination of an operation caused by a reduction in fixing temperature during a printing operation or a copying operation.

At the same time, an amount of suppliable power of an ordinary power line is required to be limited. As a result, device design is significantly restricted. To prevent maximum amount of suppliable power of the power line from being exceeded, Japanese Patent Application Laid-open No. 2004-236492 describes a following power supply unit and image forming apparatus. The power supply unit predicts power consumption. When the predicted power consumption exceeds an amount of suppliable power of a main power source, the power supply unit switches power from the main power supply to power from an auxiliary power supply using a switching circuit and supplies a number of loads with the switched power.

Japanese Patent Application Laid-open No. 2005-221674 describes a following image forming apparatus. The image forming apparatus uses a constant-voltage power supply circuit as an auxiliary power supply and sets an output voltage from the auxiliary power supply to be higher than an output voltage from a main power supply. The image forming apparatus applies the output voltage from the auxiliary power supply to a power supply line leading from the main power supply to a load, via a diode that prevents backflow to the main power supply. The image forming apparatus also applies the output voltage from the auxiliary power supply to a power supply line between the diode and the load, via a switch or another diode. The image forming apparatus supplies power from only the auxiliary power supply to the load when the output voltage from the auxiliary power supply is higher than the output voltage from the main power supply.

However, in conventional technology, a power output circuit of a capacitor, namely a power supply circuit supplying power to a load, is a constant-voltage power supply. Therefore, when the power supplied to the load is switched between an output from an AC\DC power supply (main power supply) that is the constant-voltage power supply and an output from an auxiliary power supply that is also the constant-voltage power supply, using a switching circuit, voltage fluctuation occurs during switching because of a difference in output voltages from the two constant-voltage power supplies. When the voltage fluctuation occurs, an operation of a motor to which the power is being supplied becomes unstable. Problems may occur, such as the motor stopping and uneven rotation of the motor. Uneven rotation of the motor causes image abnormality in the image forming apparatus. For example, color shifting occurs in a color image forming apparatus.

Therefore, the present applicant presented a power supply unit in Japanese Patent Application No. 2005-335889, which uses a constant-voltage power supply as a second power supply (auxiliary power supply). The power supply unit connects an output from a first power supply (main power supply) performing constant-voltage control and an output from the second power supply in parallel and simultaneously supplies the output from the first power supply and the output from the second power supply to a load. The power supply unit eliminates switching of the power supply from one power supply to the other and reduces voltage fluctuation caused by the switching.

As described above, the power supply unit simultaneously supplies the output from the first power supply and the output from the second power supply to the load. In the power supply unit, the second power supply supplies an amount of current that is an amount by which a load current exceeds a maximum current indicated to the first power supply. The second power supply is the auxiliary power supply. As a result, the power supply unit requires a means of determining the load current. Therefore, a current detection resistor is added to a power supply line between the load and a parallel connecting point of the output from the first power supply that is the main power supply and the output from the second power supply that is the auxiliary power supply. However, when the current detection resistor is added and load fluctuation occurs, an applied load voltage fluctuates by an amount attributed to the current detection resistor. A resistance value of the current detection resistor can be made small as a method for reducing the fluctuation. However, the fluctuation cannot be reduced further than a fluctuation level of when no current detection resistor is present. A differential amplifier secures a voltage level of a load current detection signal to be inputted to a current indicator at a latter stage. In a load current detector, gain of the differential amplifier becomes too large. Errors in detection currents may increase, and detection accuracy may decrease. When a current sensor (such as a Hall integrated circuit (IC)) that does not use resistive elements is used for load current detection, the fluctuation in the applied load voltage caused by addition of the current sensor is eliminated. However, cost significantly increases.

SUMMARY OF THE INVENTION

It is an object of the present invention to at least partially solve the problems in the conventional technology.

A power supply unit according to one aspect of the present invention includes a first power supply of a constant-voltage output to supply a power to a load by using a power supplied from an external source as an input source; a signal generating unit that includes a converting unit that converts a load current flowing in the load into a current signal, the signal generating unit generating a control signal for compensating a shortfall of the load current indicated by the current signal when exceeding an upper limit of an output current of the first power supply; a capacitor for charging a power; and a second power supply of a constant-current output to supply a power to the load based on the control signal by using the power from the capacitor as an input source. The first power supply controls an output voltage therefrom in such a manner that a voltage of a power supply line that is closer to the load than a current detection position of the converting unit is made constant at a setting value.

A power supply unit according to another aspect of the present invention includes a first power supply of a constant-voltage output to supply a power to a load by using a power supplied from an external source as an input source; a signal generating unit that includes a converting unit that converts a load current flowing in the load into a current signal, the signal generating unit generating a control signal for compensating a shortfall of the load current indicated by the current signal when exceeding an upper limit of an output current of the first power supply; a capacitor for charging a power; and a second power supply of a constant-current output to supply a power to the load based on the control signal by using the power from the capacitor as an input source. The converting unit converts the load current at a stage prior to a loading position for an output voltage fed back by the first power supply to control the constant-voltage output into the current signal.

An image forming apparatus according to still another aspect of the present invention includes an image forming unit that forms an image on a recording medium; and a power supply unit that supplies a power to an electrical load of the image forming unit. The power supply unit includes a first power supply of a constant-voltage output to supply a power to the load by using a power supplied from an external source as an input source, a signal generating unit that includes a converting unit that converts a load current flowing in the load into a current signal, the signal generating unit generating a control signal for compensating a shortfall of the load current indicated by the current signal when exceeding an upper limit of an output current of the first power supply, a capacitor for charging a power, and a second power supply of a constant-current output to supply a power to the load based on the control signal by using the power from the capacitor as an input source. The first power supply controls an output voltage therefrom in such a manner that a voltage of a power supply line that is closer to the load than a current detection position of the converting unit is made constant at a setting value.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail below with reference to the accompanying drawings.

To facilitate understanding of the contents, corresponding components or equivalent components according to an embodiment, shown in diagrams and described hereafter, are added within parentheses as an example for reference. The same applies hereafter.

Figure 1:
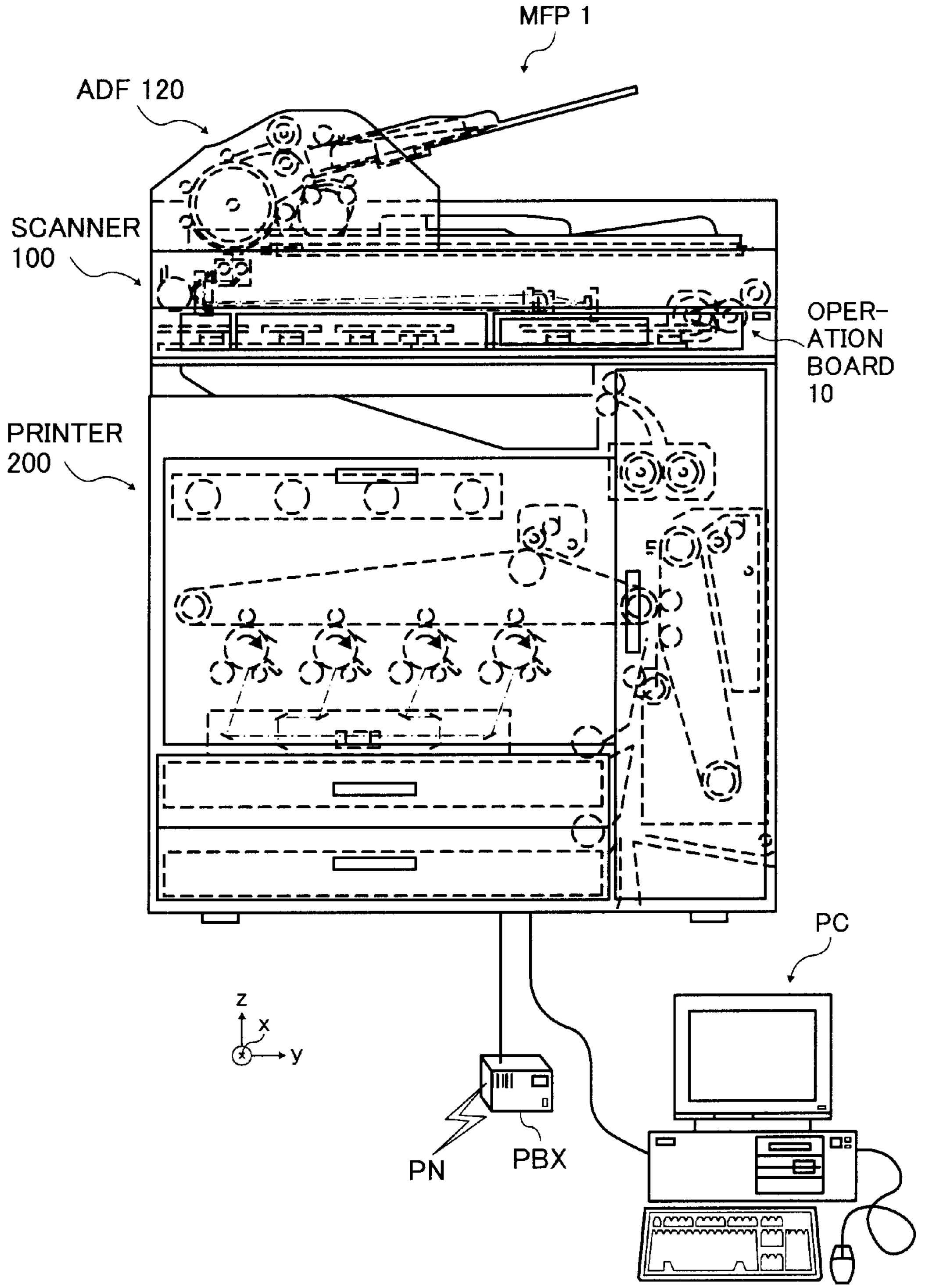
FIG. 1 is a front elevational view of an outer appearance of an MFP according to a first embodiment of the present invention.

FIG. 1 is diagram of an outer appearance of a full-color digital MFP 1 according to a first embodiment of the present invention. The full-color digital MFP 1 includes an automatic document feeder (ADF) 120, an operation board 10, a color scanner 100, and a color printer 200. The operation board 10 and the color scanner 100 including the ADF 120 are units that can be detached from the printer 200. The color scanner 100 includes a control board that includes a powered-device driver, a sensor input, and a controller. The color scanner 100 is directly or indirectly connected to an engine controller and reads an original image at a controlled timing.

Figure 2:
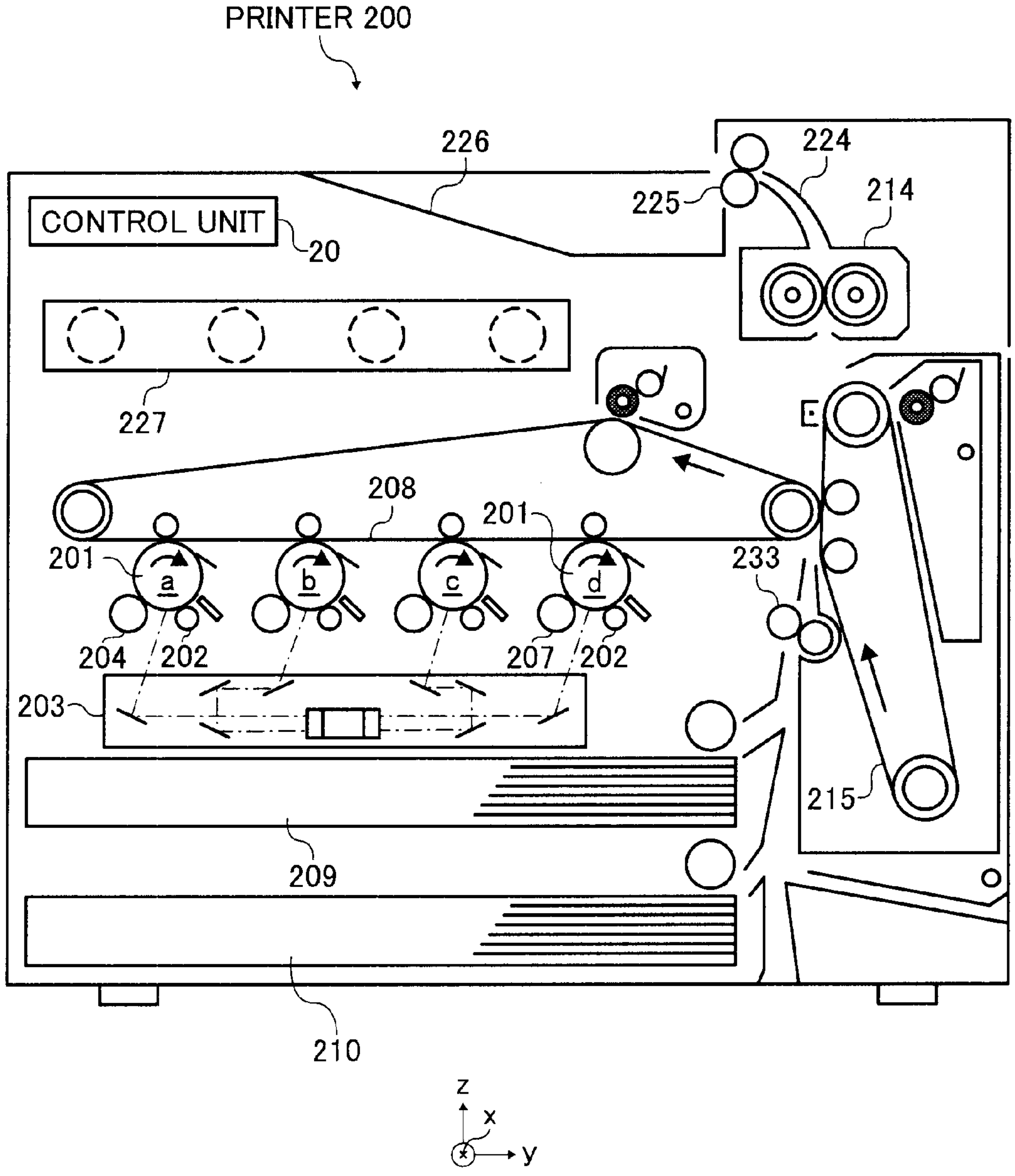
FIG. 2 is an enlarged vertical cross-sectional view of a color printer shown in FIG. 1.

FIG. 2 is a diagram of a mechanism of the printer 200. The printer 200 according to the embodiment is a laser printer. The printer 200 forms images using each of following colors: magenta (M), cyan (C), yellow (Y), and black (black: K). Therefore, four sets of toner image producing units a to d are sequentially disposed along a movement direction of a first transfer belt 208 (left to right direction y in the diagram). In other words, the printer 200 is a four-drum type (tandem-type) full-color image forming apparatus. Photosensitive elements 201 are rotatably held, and revolve in a direction indicated in the diagram by an arrow. An anti-static agent, a cleaning unit, a charging unit 202, and a developing unit 204 are provided in outer peripheries of the photosensitive elements 201. A space is secured between the charging unit 202 and the developing unit 204. Optical information transmitted from an exposing unit 203 enters the space. Four photosensitive elements 201 (a, b, c, and d) are provided. A structure of components used in image formation provided in the periphery of each photosensitive element 201 is the same. Color materials (toner) handled by developing units 204 differ. A part of each photosensitive element 201 (four photosensitive elements) is in contact with the first transfer belt 208. A belt-shaped photosensitive element can also be used.

The first transfer belt 208 is held and positioned between rotating support rollers and a driving roller to allow the first transfer belt 208 to move in a direction indicated in the diagram by an arrow. First transfer rollers are provided on a back side of the first transfer belt 208 (within a belt loop), near the photosensitive elements 201. A cleaning unit for the first transfer belt is provided on an outer side of the belt loop. After toner image is transferred from the first transfer belt 208 onto toner paper (paper) or a second transfer belt, the cleaning unit wipes off unnecessary residual toner from the surface of the first transfer belt 208. The exposing unit 203 irradiates optical information corresponding to full-color image formation onto photosensitive element surfaces as a latent image. The photosensitive elements are uniformly charged. The exposing unit 203 irradiates the optical information using a known laser method. An exposing unit including a light-emitting diode (LED) array and an imaging unit can also be used.

In FIG. 2, a second transfer belt 215 is provided on the right side of the first transfer belt 208. The first transfer belt 208 and the second transfer belt 215 are in contact and form a transfer nip that is established in advance. The second transfer belt 215 is held and positioned between support rollers and a driving roller to allow the second transfer belt 215 to move in a direction indicated in the diagram by an arrow. A second transfer unit is provided on the back side of the second transfer belt 215 (within the belt loop). A cleaning unit, a charger, and the like for the second transfer belt 215 are provided on the outer side of the belt loop. The cleaning unit wipes off unnecessary residual toner from the surface of the second transfer belt 215, after the toner is transferred to the paper. The transfer paper (paper) is stored in paper supply cassettes 209 and 210, shown in the lower area of the diagram. The paper on top is sent to a resist roller 233 one sheet at a time by a paper supply roller, via a plurality of paper guides. A fixing unit 214, a paper discharging unit 224, a paper discharging roller 225, and a paper discharging stack 226 are provided above the second transfer belt 215. A storing unit 227 that can store refill toner is provided above the first transfer belt 208 and below the paper discharging stack 226. Four toner colors are provided: magenta, cyan, yellow, and black. The toner is in cartridge-form. The toner is appropriately supplied to the developing unit 204 of a corresponding color by a powder pump or the like.

Operations performed by each component when duplex printing is performed will be described. First, the photosensitive element 201 performs imaging. In other words, by an operation performed by the exposing unit 203, light from a laser diode (LD) light source (not shown) reaches the photosensitive element 201 of an imaging unit a, among the photosensitive elements 201 that are uniformly charged by the charging unit 202, via an optical component (not shown). The photosensitive element 201 forms a latent image corresponding to written information (information depending on color). The developing unit 204 develops the latent image on the photosensitive element 201. A developed image is formed on a surface of the photosensitive element 201 using the toner and the image is held. A first transfer unit transfers the toner image to the surface of the first transfer belt 208 moving synchronously with the photosensitive element 201. The cleaning unit cleans the residual toner from the surface of the photosensitive element 201. The anti-static agent discharges the surface of the photosensitive element 201, and the surface of the photosensitive element 201 is prepared for a next imaging cycle. The first transfer belt 208 carries the toner image transferred onto the surface of the first transfer belt 208 in the direction of the arrow. A latent image corresponding with a different color is written on the photosensitive element 201 of an imaging unit b. The latent image is developed using the toner of the corresponding color and a developed image is formed. The image is superimposed on the developed image of the previous color that has already been transferred to the first transfer belt 208. Ultimately, images of the four colors are superimposed. In some cases, only the image of a single color, black, is formed. At this time, the second transfer belt 215 synchronously moves in the direction of the arrow. By an operation of a second transfer unit 117, the image formed on the surface of the first transfer belt 208 is transferred onto the surface of the second transfer belt 215. The imaging is performed using a so-called tandem method. In the tandem method, the first transfer belt 208 and the second transfer belt 215 move while the images are being formed on the respective photosensitive elements 201 of four imaging unit a to d. Therefore, time can be reduced. When the first transfer belt 208 moves to a predetermined position, the toner image to be formed on another surface of the paper is imaged once again by the photosensitive element 201, by the steps described above. Paper supplying starts. The paper that is on top within a paper supply cassette 121 or a paper supply cassette 122 is pulled out and carried to the resist roller 233. The second transfer unit 117 transfers the toner image on the surface of the first transfer belt 208 onto one surface of the paper sent between the first transfer belt 208 and the second transfer belt 215, via the resist roller 233. Then, the paper is carried above. The charger transfers the toner image on the surface of the second transfer belt 215 onto the other side of the paper. When the image is being transferred, carrying of the paper is timed so that the image is in a normal position.

The paper onto which toner images have been transferred on both sides at the above-described step is sent to the fixing unit 214. The toner images on the paper (both sides) are fused and fixed. The paper discharging roller 225 discharges the paper to the paper discharging stack 226 provided in an upper area of a main body frame, via the paper discharging unit 224. As shown in FIG. 2, when a paper discharging unit 224 to 226 is configured, a surface (page) of the paper onto which the image has been transferred later, between the images on both sides, namely the surface of the paper onto which the first transfer belt 208 directly transfers the image, is placed on the paper discharge stack 226 facing downward. Therefore, to adjust pagination, an image of a second page is produced first, and the toner image is held on the second transfer belt 215. An image of a first page is directly transferred onto the paper from the first transfer belt 208. The image directly transferred onto the paper from the first transfer belt 208 is exposed so as to be a non-reverse image on the surface of the photosensitive element 201. The toner image transferred to the paper from the second transfer belt 215 is exposed so as to be a reverse image (mirror image) on the surface of the photosensitive element 201. Such imaging sequencing for adjusting pagination and image processing for switching between non-reverse images and reverse images (mirror images) are performed by an image data reading and writing control performed on the memory using the controller. After the image is transferred onto the paper from the second transfer belt 215, the cleaning unit including a brush roller, a collecting roller, a blade, and the like removes the unnecessary toner and paper dust remaining on the second transfer belt 215.

In FIG. 2, the brush roller in the cleaning unit of the second transfer belt 215 is separated from the surface of the second transfer belt 215. The brush roller is structured to allow swinging with a supporting point as a center and to allow contact with and separation from the surface of the second transfer belt 215. The brush roller is separated from the surface of the second transfer belt before the image is transferred onto the paper, when the second transfer belt 215 is carrying the toner image. When cleaning is required, the brush roller swings in a counter-clockwise direction in the diagram and contacts the surface of the second transfer belt 215. The removed residual toner is collected in a toner storing unit. An imaging process performed in duplex printing mode, when "duplex transfer mode" is set, is as described above. Duplex printing is always performed by the above-described imaging process.

Two modes are provided for one-side printing: "one-side transfer by the second transfer belt 215 mode" and "one-side transfer by the first transfer belt 208 mode". When set to the former one-side transfer mode using the second transfer belt 215, the developed image formed from the single color black or by superimposing three colors or four colors on the first transfer belt 208 is transferred onto the second transfer belt 215. Then, the image is transferred onto one side of the paper. An image is not transferred onto the other side of the paper. The printed page of the printed paper discharged to the paper discharging stack 226 faces upward. When set to the latter one-side transfer mode using the first transfer belt 208, the developed image formed from the single color black or by superimposing three colors or four colors on the first transfer belt 208 is transferred onto one side of the paper without being transferred onto the second transfer belt 215. An image is not transferred onto the other side of the paper. The printed page of the printed paper discharged to the paper discharging stack 226 faces downward.

Figures 3, 3A, 3B:
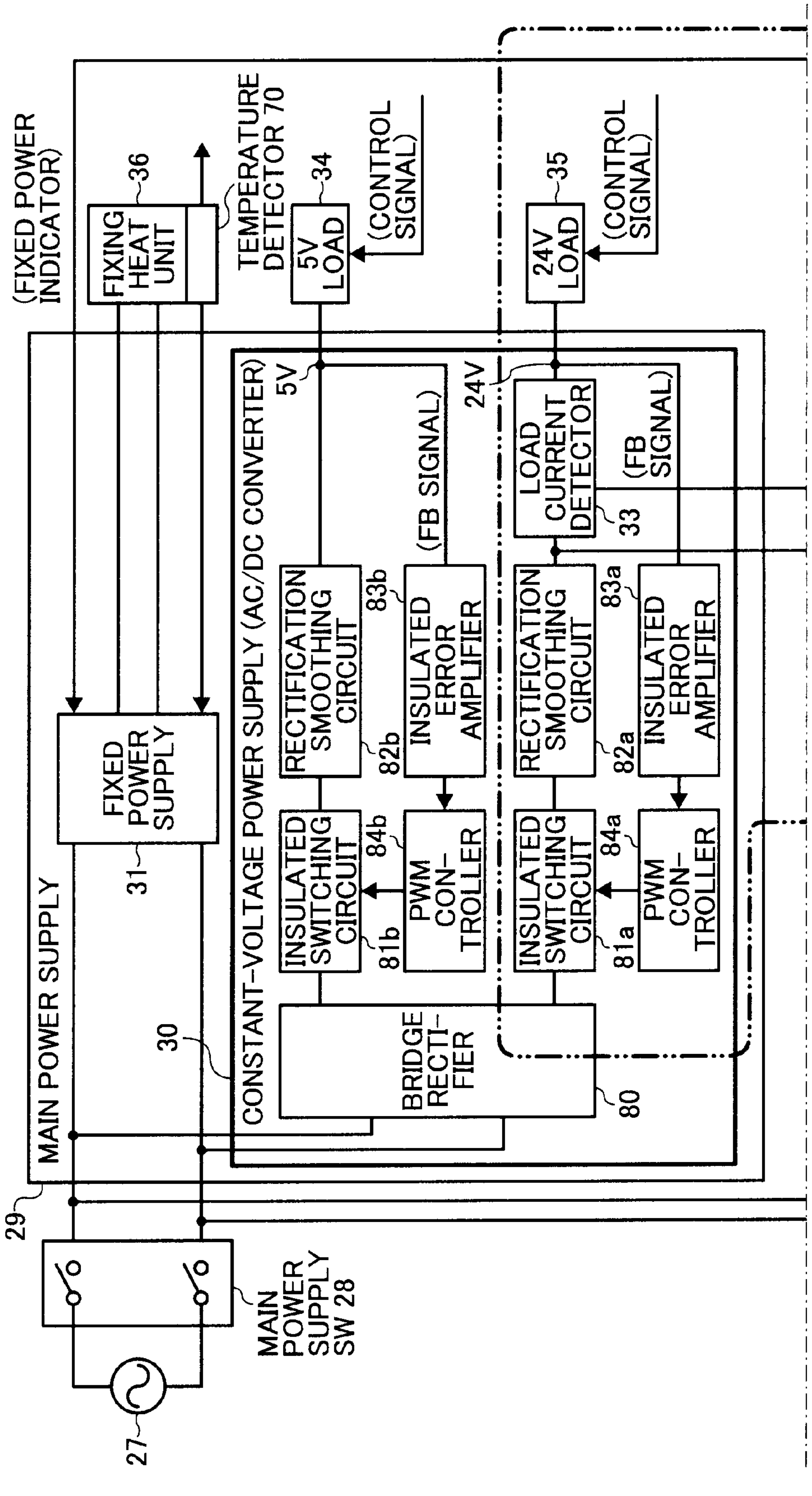
FIG. 3 is a block diagram of a configuration of a power supply unit of the MFP shown in FIG. 1.
Figure 3B:
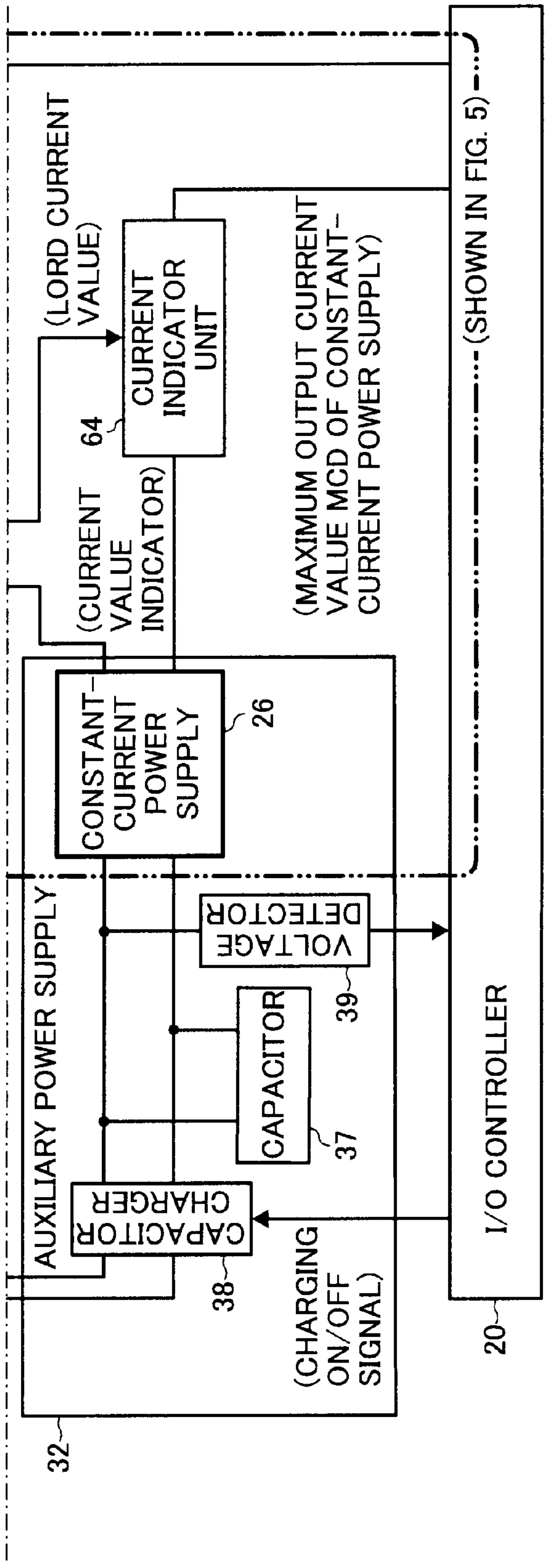

FIG. 3 is a diagram of a configuration of a power supply unit. A commercial AC power supply is supplied to a main power supply 29 and an auxiliary power supply 32 by a main power supply switch (SW) 28 being turned ON. Commercial AC voltage is applied from the commercial AC power supply to a fixed power supply 31 that is an AC control circuit, a constant-voltage power supply 30, and a capacitor charger 38 of the auxiliary power supply 32. The fixed power supply 31 performs feedback-control of fixing unit temperature using a fixing temperature signal provided from a temperature detector 70, within a power range designated by a power indicator signal provided from an I/O controller 20.

The constant-voltage power supply 30 that is a first power supply of the main power supply 29 converts commercial AC to DC using a bridge rectifier 80, an insulated switching circuit 81, and a rectification smoothing circuit 82. The constant-voltage power supply 30 generates two DC constant-voltages, 5 volts and 24 volts, through constant-voltage feedback control using a voltage detection signal provided to a pulse width modulation (PWM) controller 84, via an insulated error amplifier 83. Then, the constant-voltage power supply 30 outputs 5-volt DC constant-voltage and 24-volt DC constant voltage to a 5-volt load 34 and the 24-volt load 35. A 24-volt voltage detection signal (feedback signal) is provided to an insulated error amplifier 83*a* from a stage following a load current detector 33.

Figure 8:
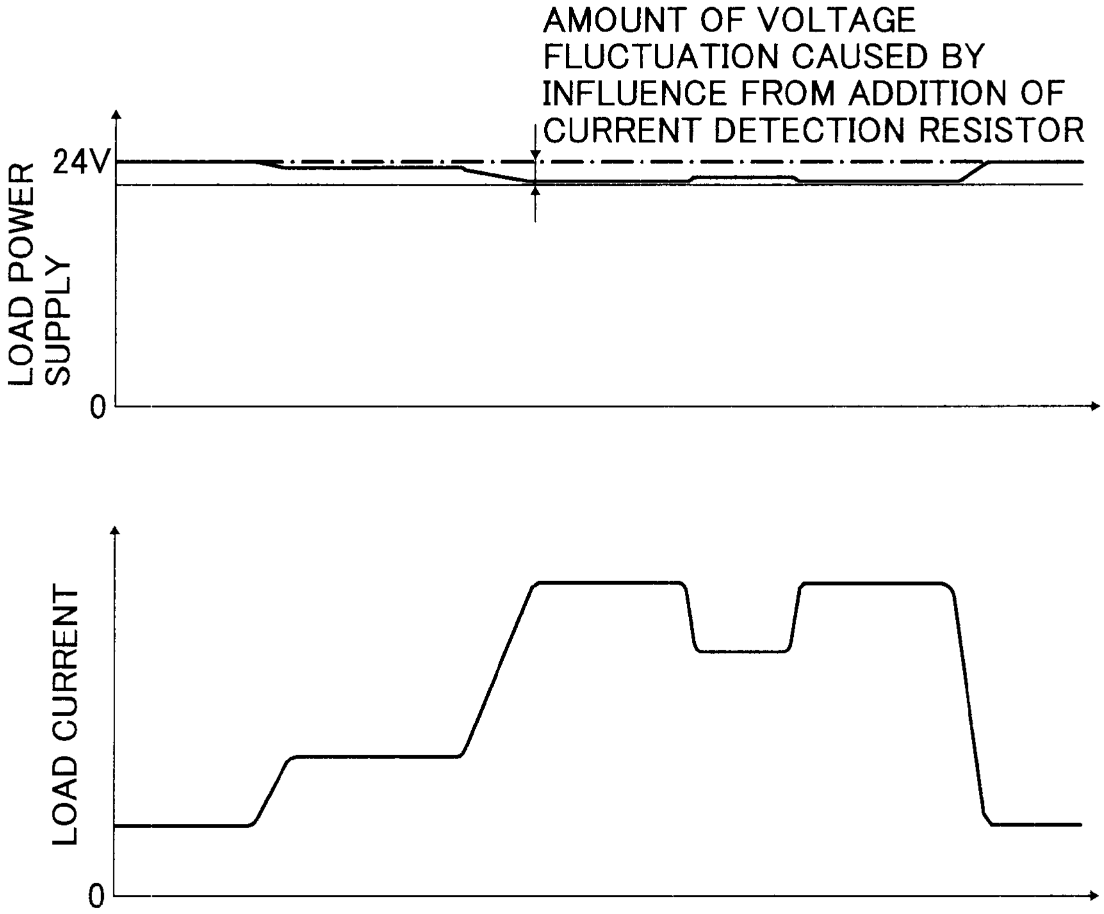
FIG. 8 is a timing chart of fluctuations in load voltage of load voltage fluctuations occurring when a current detection resistor shown in FIG. 5 is positioned closer to the load than an output voltage extracting position for feedback of the constant-voltage power supply.

Although details will be described hereafter, the load current detector 33 serially inserts a resistor 60 (FIG. 5) of several mΩ to a power supply line. Therefore, for example, when (the resistor 60 that is a current sensor of) the load current detector 33 is provided in a latter section of a voltage detection signal (feedback signal) loading unit, applied load voltage fluctuates because of an increase and decrease in voltage drop in the current detection resistor 60 caused by an increase and decrease in a load current, as shown in FIG. 8. For example, when a 10-mΩ resistor is connected to the current detection resistor 60 of the load current detector 33 and the load changes from 5 amperes to 15 amperes, a following fluctuation occurs: 0.1V (10 mΩ×(15 A−5 A)). Furthermore, for example, when the current detection resistor 60 of the load current detector 33 is added outside of the main power supply 29, an even greater applied load voltage fluctuation occurs because of influence from line resistance.

To prevent the above-described fluctuations in DC applied load voltage caused by the addition of the current detection resistor 60, according to the embodiment, voltage is fed back to the constant-voltage power supply 30 after passing though the current detection resistor 60. Constant-voltage control is performed on the feedback voltage or, in other words, feedback-control is performed so that the feedback voltage matches a target value.

According to the embodiment, the auxiliary power supply 32 includes the capacitor charger 38, a capacitor 37, and a constant-current power supply 26. The capacitor charger 38 charges the capacitor 37. The constant-current power supply 26 is a second power supply that outputs capacitor power to a power supply line leading to the 24-volt load 35 as a constant current. Power is supplied to the 24-volt load 35 using the auxiliary power supply 32 because an amount of increase in an amount of power supplied to a fixing heating unit 36 is required to be reduced from an amount of power supplied to the load 35 from the first power supply consuming AC power. The amount of power reduced is required to be compensated by the power supplied to the load 35 from the auxiliary power supply 32. Therefore, according to the embodiment, considering the amount of increase in the amount of power supplied to the fixing heating unit 36 (for example, 300 W), the auxiliary power supply 32 supplies power to the 24-volt load 35 (for example, 500 W) that consumes a larger amount of power than the 5-volt load 34 (for example, 100 W). When the amount of increase in the amount of power supplied to the fixing heating unit 36 is small or the amount of power consumed by the 5-volt load 34 is large, the auxiliary power supply 32 can supply power to the 5-volt load 34.

The load current detector 33 detects a 24-volt load current and provides a current indicator 64 with a current detection signal. The 24-volt load current is a sum of currents of currents simultaneously supplied from the constant-voltage power supply 30 (first power supply) and the constant-current power supply 26 (second power supply). The I/O controller 20 provides the current indicator 64 with maximum indicator data MCD. The maximum indicator data MCD designates a maximum output current of the constant-voltage power supply 30. The current indicator 64 provides the constant-current power supply 26 with a current indicator signal (control signal) indicating a value that is a result of a maximum indicator value being subtracted from the 24-volt load current (=output current indicator value of constant-current power supply 26). The constant-current power supply 26 supplies power from the capacitor 37 to a 24-volt load line as the constant-voltage by performing constant-voltage control of which a target value is the current indicated by the current indicator signal.

The capacitor 37 of the auxiliary power supply 32 is a large-capacity capacitor, such as an electric double-layer condenser. Various capacitors other than the electric double-layer condenser can be selected. However, the invention according to the embodiment uses the electric double-layer condenser that can be discharged and charged within a short amount of time and has a long life. In the electric double-layer condenser, terminal voltage (capacitor voltage) decreases as the condenser is discharged. Therefore, the constant-current power supply 26 is disposed following the capacitor 37 to output a required current regardless of fluctuations in the capacitor voltage.

Figure 4:
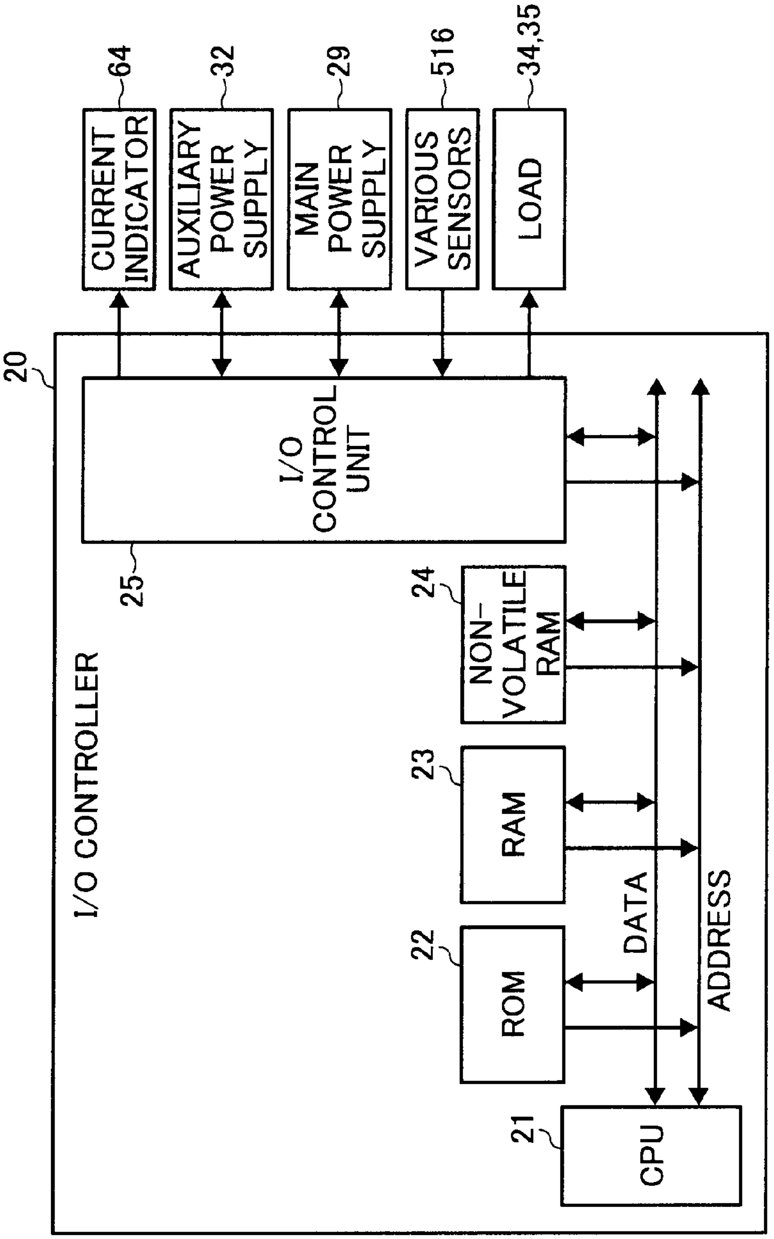
FIG. 4 is a block diagram of an overview of a configuration of an input and output (I/O) controller shown in FIG. 3.

FIG. 4 is a block diagram of a configuration of the I/O controller 20. The I/O controller 20 includes a CPU 21, a read-only memory (ROM) 22, a random access memory (RAM) 23, a non-volatile RAM 24, and an input and output (I/O) control unit 25. The CPU 21 controls input to and output from the sensors and the loads and controls the power supply unit based on control commands from an engine control (not shown), programs stored in the ROM 22, and programs and data stored in the non-volatile RAM 24. The engine control controls an imaging engine shown in FIG. 2. The ROM 22 stores programs used to operate the CPU 21. The RAM 23 is used as a work memory of the CPU 21. The non-volatile RAM 24 stores a power consumption table, a printing process time table, and the like. The power consumption table stores power consumption data in an operation state of each load and in each operation mode. The printing process time table stores time data of time required for the printing process in each operation mode. The I/O control unit 25 controls reading of input from each sensor 516 in the full-color digital MFP 1 and driving of individual loads 35.

The I/O controller 20 controls input to and output from the sensors and controls the power supply, based on instructions involving image-reading performed during engine control, process control of processes such as printing and copying, and sequence control. The I/O controller 20 sequentially operates each load depending on respective operation modes. The I/O controller 20 also controls discharging and charging of the capacitor 37. When the unit is started and during a period until an elapse of a predetermined time after start-up, power accumulated in the capacitor 37 is supplied to the 24-volt load 35. At this time, the amount of power supplied to the fixing heating unit 36 increases because of excess amount of power supplied from an AC power supply line 27.

Figure 5:
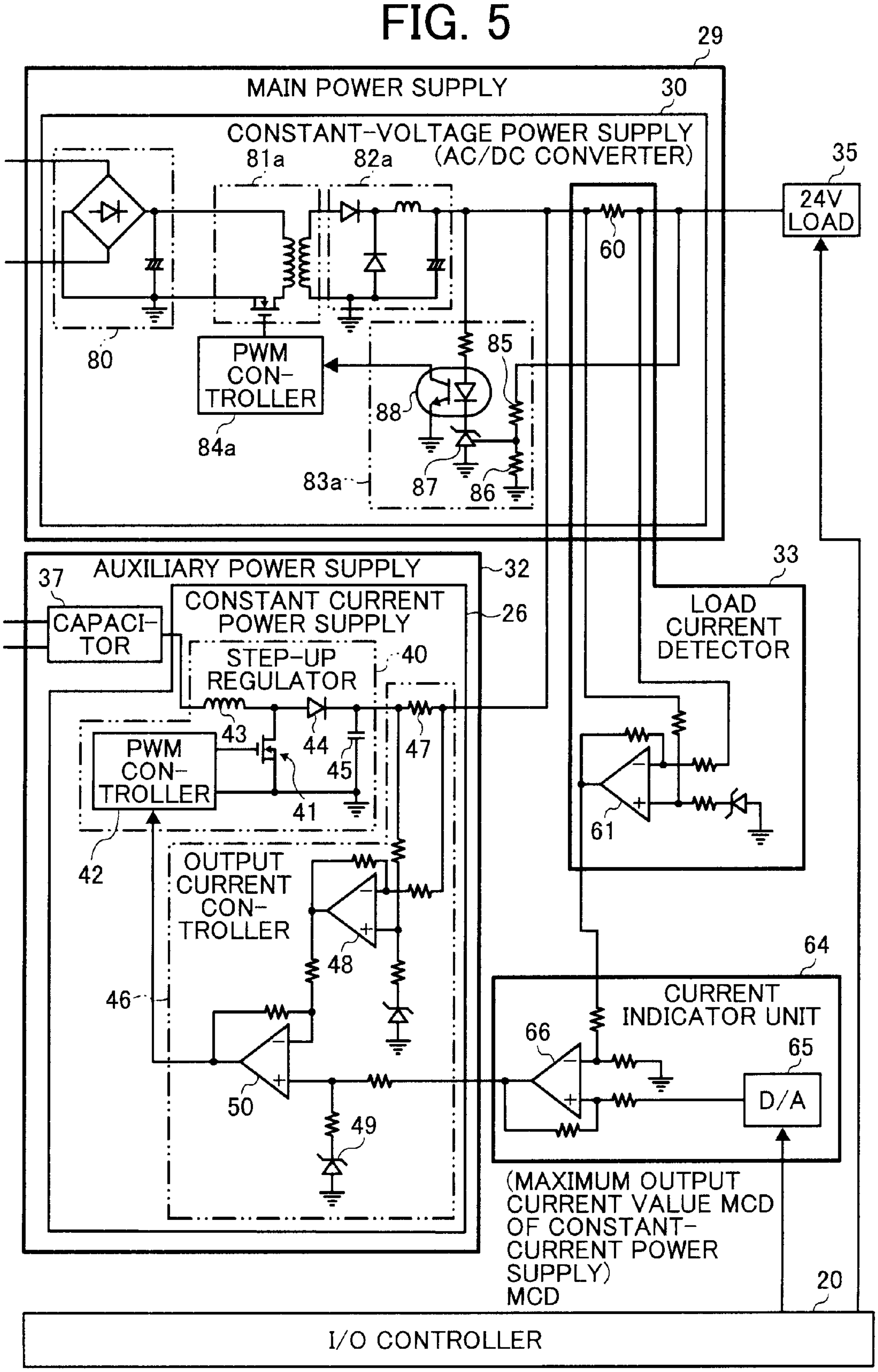
FIG. 5 is an electrical circuit diagram of configurations of a constant-voltage power supply, a constant-current power supply, a load current detector, and a current indicator shown in FIG. 3.

FIG. 5 is a diagram of detailed configurations of the constant-voltage power supply 30, the constant-current power supply 26, the load current detector 33, and the current indicator 64 shown in FIG. 3. In the constant-voltage power supply 30 of the main power supply 29, voltage divider resistors 85 and 86 divide voltage at a latter stage (DC load 35 side) of the current detection resistor 60 to generate the voltage detection signal. The current detection resistor 60 is included in the load current detector 33. A shunt regulator 87 compares the voltage detection signal with a reference voltage and amplifies the voltage detection signal. A photo-coupler 88 isolates the voltage detection signal. The constant-voltage power supply 30 provides a PWM controller 84*a* with the isolated voltage detection signal as a feedback signal used to perform constant-voltage control. The constant-voltage power supply 30 performs constant-voltage control of the voltage, namely the applied load voltage, immediately before the power is supplied to the 24-volt load 35 or, in other words, the power supply line between the current detection resistor 60 and the 24-volt load 35.

According to the embodiment, the capacitor 37 of the auxiliary power supply 32 is an electric double-layer capacitor. The electric double-layer capacitor has low withstand voltage. Maximum charging voltage during use is 2.5 volts. Therefore, to acquire high withstand voltage, several electric double-layer capacitors are required to be serially connected. However, if a small number of large-capacity capacitors are used rather than a large number of serially-connected small-capacity capacitors, a same capacity can be obtained at a lower cost. When less than nine serially-connected electric double-layer capacitors are used to supply power to the 24-volt load, charging voltage is less than the maximum charging voltage 2.5 volts. Therefore, the constant-current power supply 26 is required to include a step-up regulator. According to the embodiment, a step-up regulator 40 of the constant-current power supply 26 boosts the power of the capacitor 37, and the constant-current power supply 26 outputs the constant current.

A semiconductor switch 41 of the step-up regulator 40 is in a conductive state (ON) when an output PWM pulse from a PWM controller 42 is held H. The semiconductor switch 41 is in a non-conductive state (OFF) when the output PWM pulse is held L. When the semiconductor switch 41 is in the conductive state, current flows from the capacitor 37 to a reactor 43 and the semiconductor switch 41. The reactor 43 stores the power. When the semiconductor switch 41 transitions to the non-conductive state, voltage of the power stored by the reactor 43 becomes high, and a capacitor 45 is charged with the high-voltage, via a diode 44. Repeated ON/OFF of a PWM pulse cycle of the semiconductor switch 41 causes the voltage of the capacitor 45 to rise. The voltage passes through a current detection resistor 47 or the current detection resistor 60 of the load current detector 33 and is supplied to the 24-volt load 35.

The load current detector 33 amplifies potential difference of both ends of the current detection resistor 60 using a differential amplifier 61. The load current detector 33 generates a load current signal (analog voltage) proportional to the load current and outputs (applies) the load current signal to the current indicator 64.

The current indicator 64 converts the maximum current indicator data MCD provided by the I/O controller 20 to an analog maximum indicator signal (voltage) using a digital-to-analog (D/A) converter 65. The current indicator 64 calculates "load current detection value−maximum indicator value" using a differential amplifier 66 and outputs a difference voltage expressing a result of the calculation to the constant-current power supply 26 as the current indicator signal. In other words, the current indicator 64 uses a difference value obtained by subtracting the maximum output current of the constant-voltage power supply 30 indicated by the I/O controller 20 from the 24-volt load current detector as the target value to be compensated by the constant-current power supply 26 and instructs the constant-current power supply 26 to output a current of the difference value.

The constant-current power supply 26 amplifies potential difference of both ends of the current detection resistor 47 using a differential amplifier 48. The constant-current power supply 26 generates an output current signal proportional to an output current and provides a differential amplifier 50 with the output current signal. The differential amplifier 50 amplifies a difference of the output current signal and a target current signal provided by the current indicator 64. Then, the differential amplifier 50 adds a voltage provided by a bias circuit 49 and provides the signal to the PWM controller 42 as a PWM pulse duty indicator signal.

The PWM controller 42 determines duty indicated by the duty indicator signal to be duty of the PWM pulse performing ON/OFF driving of the semiconductor switch 41. In other words, when an output signal from the current indicator 64 is held high and an output current from the differential amplifier 50 rises, the duty of the PWM pulse is raised. Therefore, the output current of the step-up regulator 40 increases. When the voltage drop of the current detection resistor 47 increases, the level of the output current detection signal increases, and the output voltage of the differential amplifier 50 decreases as a result, the duty of the PWM pulse decreases. Thus, the output current of the step-up regulator 40 decreases. As a result of such a feedback PWM control, the output current of the step-up regulator 40 becomes a value equivalent to a difference that is the maximum output current MCD of the constant-voltage power supply 30 indicated by the I/O controller 20 subtracted from the 24-volt load current detection value provided by the current indicator 64.

The current detection resistor 60 of the load current detector 33 is mounted on a same circuit board as the constant-voltage power supply 30 of the main power supply 29 as a part of the constant-voltage power supply 30. The differential amplifier 61 of the load current detector 33 and associated resistors are connected to the current detection resistor 60 by a connector and a harness. The differential amplifier 61 is provided on a separate circuit board from the constant-voltage power supply 30 (the main power supply 29). Voltages from both ends of the current detection resistor 60 serve as inter-circuit board interface signals. As a result of the above-described configuration, degradation of output accuracy of the constant-voltage power supply 30 caused by an extension (elongation) of a constant-voltage feedback loop of the constant-voltage power supply 30 is minimized. In other words, increase in cost of the constant-voltage power supply 30 to allow the constant-voltage power supply 30 to correspond to remote-sensing is suppressed.

When considering allowing an auxiliary power supply system (combinations of the auxiliary power supply 32, the current indicator 64, and the load current detector 33) to be optional, the auxiliary power supply 32, the current indicator 64, the differential amplifier 61 of the load current detector 33, and the resistors associated with the current indicator 64 can be easily removed from a main power supply system (the main power supply 29) without changing the main power supply system, when the power supply unit is chosen to have no auxiliary power supply system Therefore, cost of the main power supply system (the main power supply 29) only increases by the addition of the current detection resistor 60. Barely any extra cost is required to configure the main power supply system to be connectable to the auxiliary power supply system.

For example, even when the auxiliary power supply system is not included, as described above, if the main power supply 29 includes the current detection resistor 60, power consumption caused by the current detection resistor 60 occurs even in a power supply unit that is not connected the auxiliary power supply system. For example, when a 10-mΩ resistor is connected and a load of the system during operation is 15 amperes, the power consumption is 2.25 watts. The value is further decreased when the load is light during waiting time. To handle the reduced value, the current detection resistor 60 is not mounted and a jumper wire is connected instead. As a result, changes made to the configuration are slight, and the configuration of the main power supply 29 can be prevented from becoming complicated. The cost of the main power supply 29 when the auxiliary power supply system is not included can be further reduced.

According to another embodiment of the present invention, the load current detector 33 including the differential amplifier 61 and the associated resistors is mounted on the same circuit board as the constant-voltage power supply 30 of the main power supply 29 as a part of the constant-voltage power supply 30. The load current detector 33 is connected to the current indicator 64 by a connector and a harness or the like. The current indicator 64 is provided on a separate circuit board from the constant-voltage power supply 30 (the main power supply 29). The load current signal outputted from the differential amplifier 61 serves as the inter-circuit board interface signal. According to the embodiment, the cost of the main power supply increases by the differential amplifier 61 and the associated resistors, compared to the above-described configuration. However, almost a same effect can be obtained. In addition, an amount of noise resistance can be increased through transfer of amplified signals. In other words, stability of current detection performance can be enhanced.

Figure 6A:
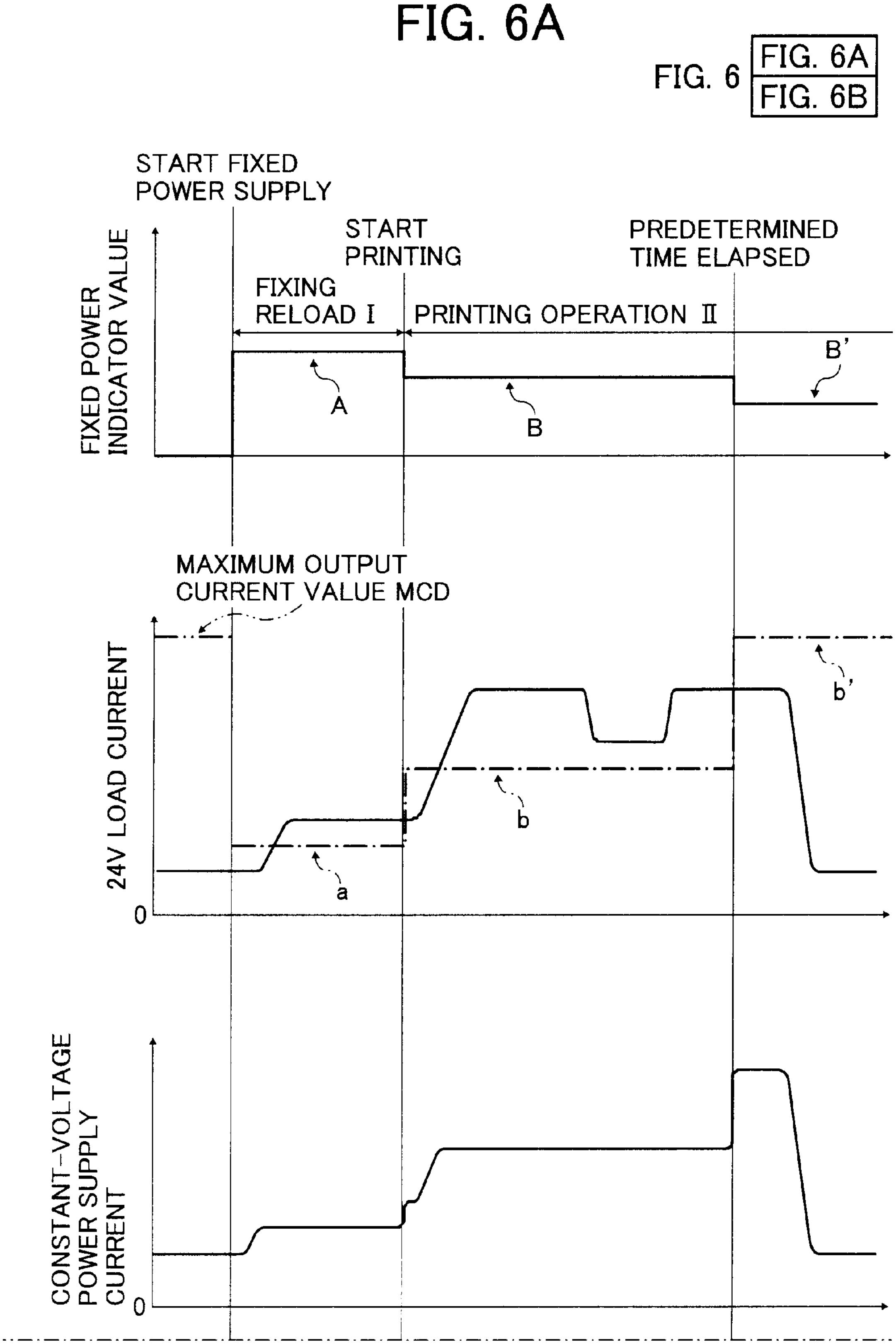
FIG. 6 is a timing chart showing a relationship among a fixed power indicator value, a maximum 24-volt output current MCD of the constant-voltage power supply, a current (load current) from load, a 24-volt output current from the constant-voltage power supply, an output current from the constant-current power supply, and AC input power supplied to the power supply unit, operated under a power-supply control performed by the I/O controller.
Figure 6B:
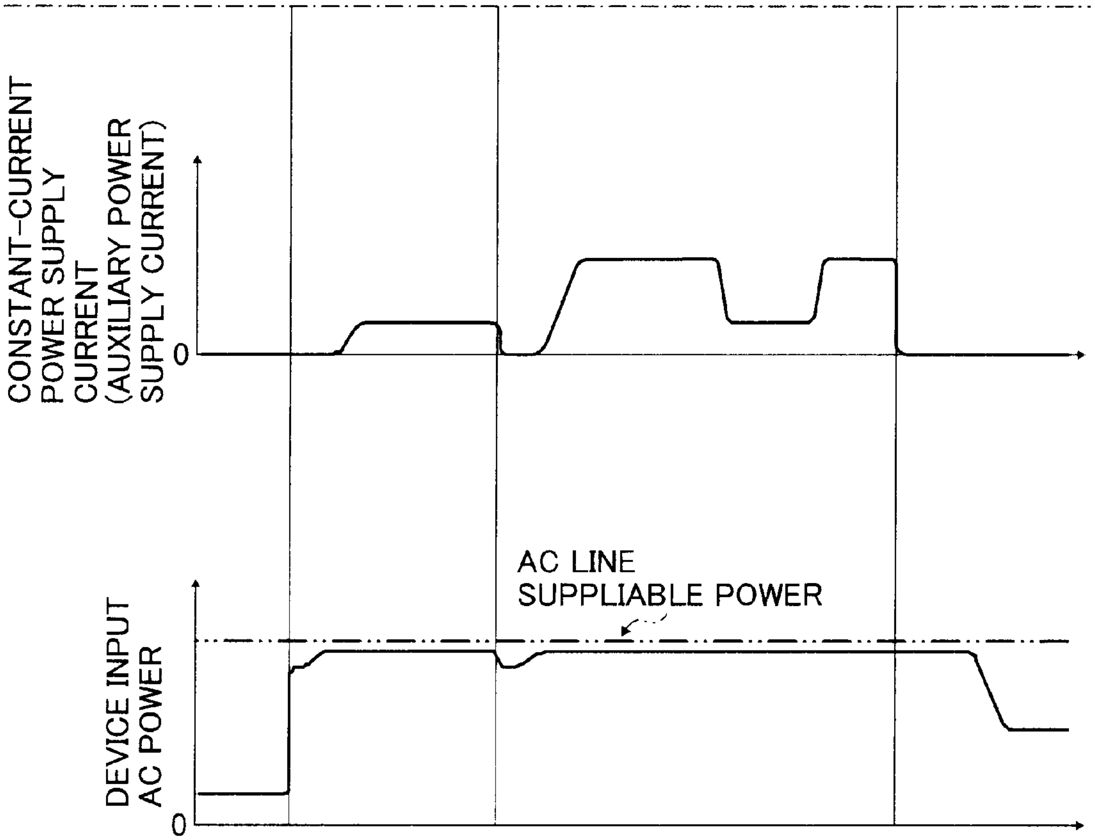

FIG. 6 is a graph of transitions of a fixed power indicator value, the 24-volt load current, current supplied from the constant-voltage power supply, current supplied from the constant-current power supply, and power inputted into devices. The transitions are from start-up immediately after operation voltage is applied to each component in the copier. Alphabet letters within parentheses hereafter correspond to alphabet letters in FIG. 6. Numerical values are examples of setting power.

Immediately after the main power supply SW 28 is turned ON, during a fixing reload period I during which the fixing temperature is raised to a target temperature, a larger amount of power than is normally required is supplied to the fixing heating unit 36 (A: 1300 W) and the temperature of the fixing heating unit 36 is raised as quickly as possible to a temperature that can be used for printing, to satisfy a start-up time required by the copier MF1. The temperature of the fixing heating unit 36 being raised to a temperature that can be used for printing is called fixing reload. At this time, the constant-voltage power supply 30 and the constant-current power supply 26 simultaneously supplies power to the 24-volt load 35. The AC power consumption of the constant-voltage power supply 30 is reduced, the AC power assigned to the fixed power supply 31 is increased, fixing heating unit power is increased, and the start-up time is reduced. The maximum output current MCD at this time is a current indicator value (a). The current indicator value (a) becomes power that is the amount of suppliable power of the AC power supply line 27 subtracted by the amount of power assigned to the fixed power supply 31 and the amount of power supplied to the 5-volt load.

Once the fixing heating unit 36 reaches the temperature that can be used for printing, power supplied to the fixing heating unit can be smaller than during fixing reload to maintain the temperature. However, at a printing start time II after completion of fixing reload, the decrease in the fixing temperature caused by paper being sent is significant. Therefore, the power supplied to the fixing heating unit is required to be larger that that required for normal printing during a period until the temperature stabilizes. During the printing operation, the power consumption of the load 35 increases because of activation of motors and the like. Total power including the power supplied to the fixing heating unit may exceed the amount of suppliable power of the AC power supply line 27. Therefore, power distribution of the fixed power supply 31 is a value (B: 1200 W) smaller than a value during fixing reload and larger than a value during normal printing (B': 900 W). The difference in the value from during fixing reload is added to the constant-voltage power supply 30, and the amount of power suppliable to the 24-volt load 35 is increased (b). On other words, a setting of the maximum current MCD provided to the current indicator 64 from the I/O controller 20 is changed (to a value larger than the value during fixing reload) and AC power consumption is held lower than a maximum power suppliable to the AC power supply line 27. As a result, the constant-voltage power supply 26 supplies the load 35 with a load current of an amount deficient from the output current of the constant-voltage power supply 30 to keep the AC power consumption near the maximum value.

The power accumulated in the capacitor 37 of the auxiliary power supply 32 is limited. Continuous supply becomes impossible. Therefore, when a predetermined amount of time until the fixing temperature stabilizes elapses, the maximum current setting MCD is set to a large value (b') and power supply to the load 35 from the constant-current power supply 26 is stopped so that only the constant-voltage power supply 30 of the main power supply 29 supplies power to the load 35. At this time, power supply to the fixing heating unit is changed to power supplied during normal printing (B'). A period until stabilization of the fixing temperature, which is a power supply stop timing of the auxiliary power supply 32, is prescribed as time and a number of prints to be printed. The value can be a fixed value. However, if the value is a variable of which parameters are printing paper size, room temperature, and the like, an auxiliary power supply supplying time can be set in correspondence with a fixing temperature stabilizing time that can be considered to change depending operation mode. The auxiliary power supply power can be effectively used.

Figures 7, 7A:
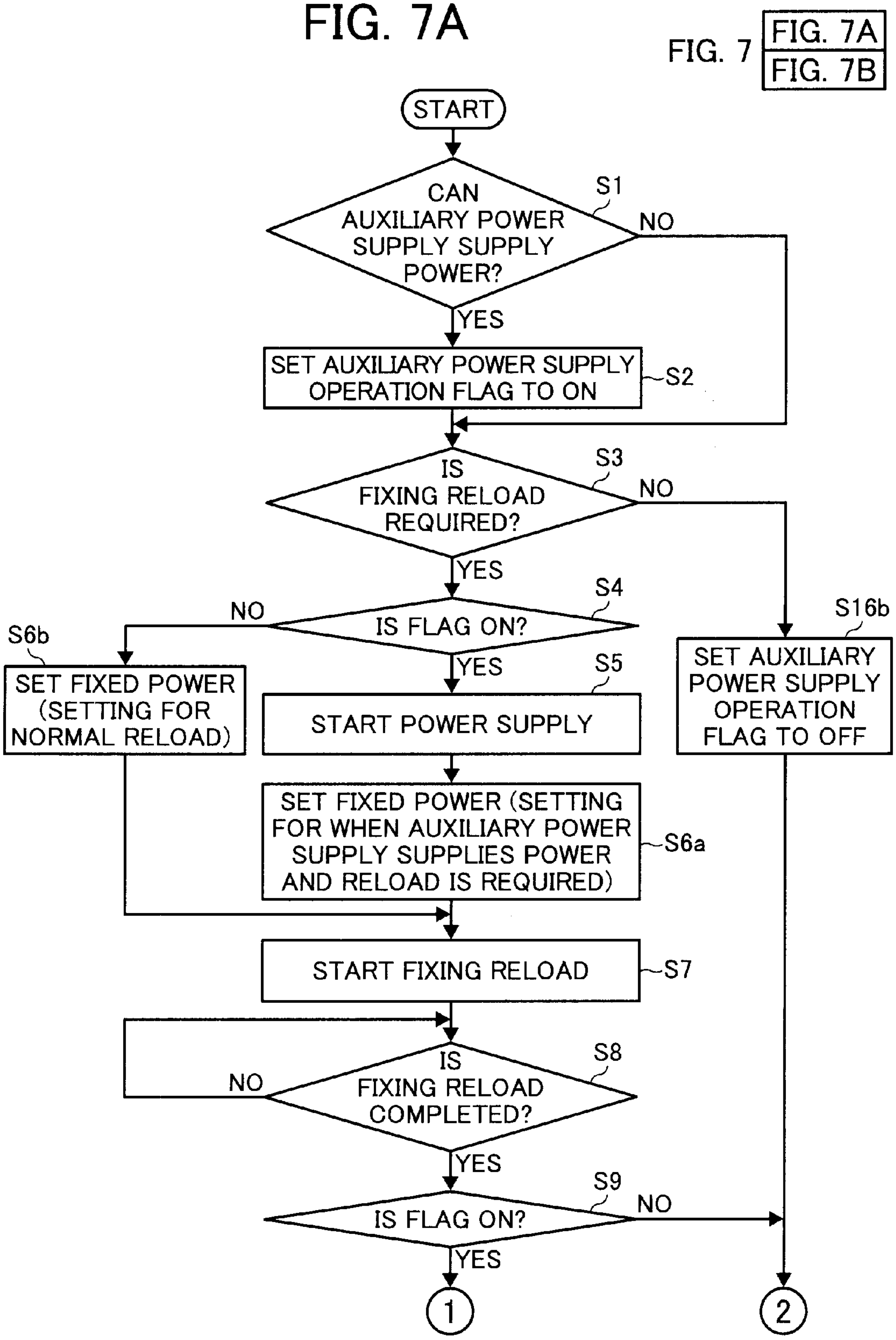
FIG. 7 is a flowchart of an overview of a power supply control performed on the constant-current power supply by (a central processing unit (CPU) of) the I/O controller shown in FIG. 4.
Figure 7B:
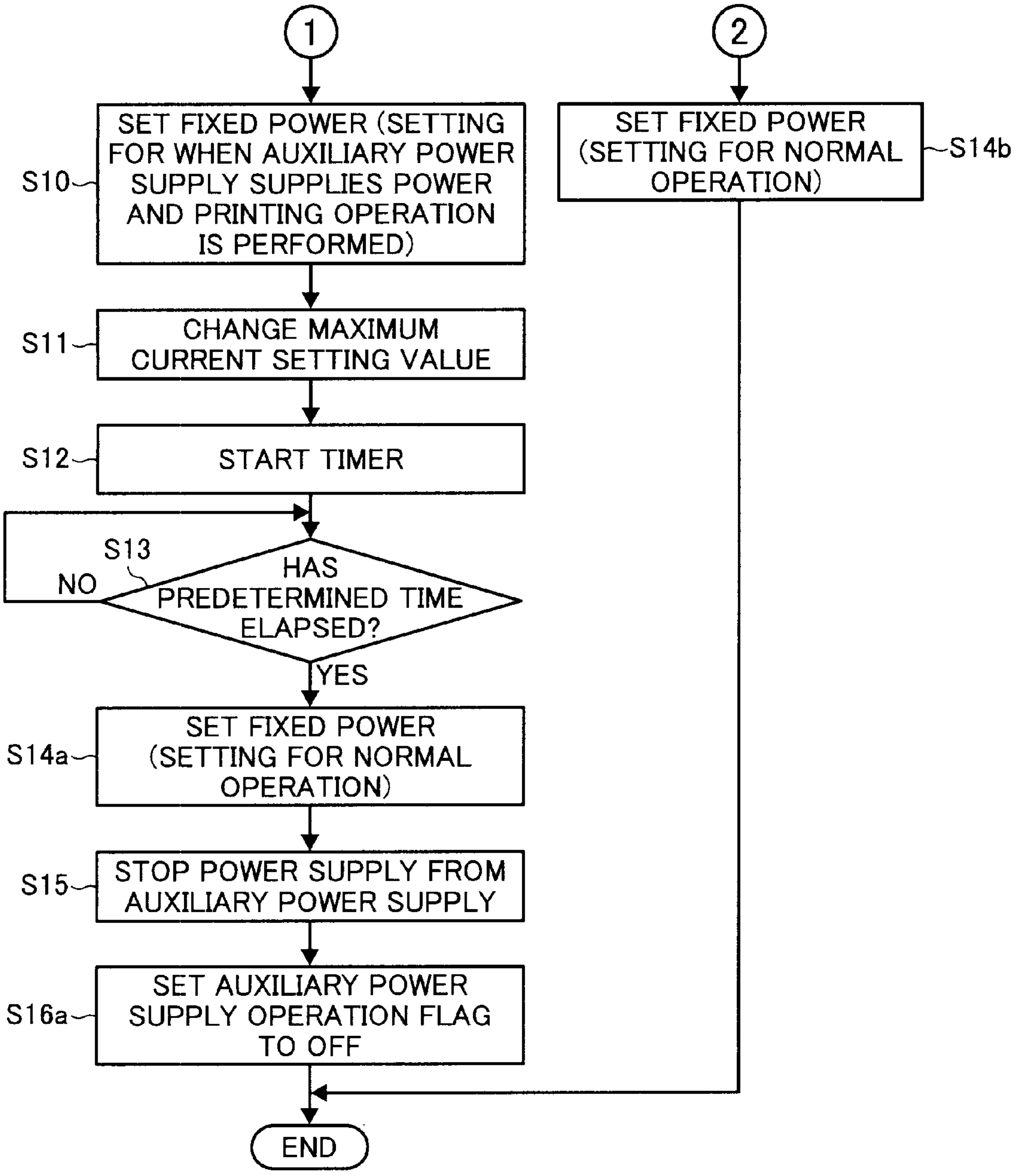

FIG. 7 is a flowchart of an overview of a power supply control of the auxiliary power supply performed by the I/O controller 20. When the main power supply SW 28 is closed after being open or when the copier MF1 returns to wait mode from power-saving mode, and the constant-voltage power supply 30 starts outputting +5-volts, the +5-volts (operation voltage) is added to the CPU 21 of the I/O controller 20, and the CPU 21 completes initialization of the I/O controller 20 in response to a power supply ON reset pulse, (the CPU 21 of) the I/O controller 20 performs the power supply control shown in FIG. 7. First, at Step S1, a voltage detector 39 (FIG. 3) detects a charging voltage and judges whether an amount of charging power held in the capacitor 37 of the auxiliary power supply 32 is at a level allowing power to be supplied. When judged that the amount of charging power is sufficient and power can be supplied, the CPU 21 sets a power suppliable flag of the auxiliary power supply to ON (Step S2). Next, the CPU 21 identifies a copier MF1 state, including detection of the fixing unit temperature performed by the temperature detector 70 (Step S3). Immediately after the main power supply SW 28 is turned ON or when the copier MF1 returns from power-saving mode, and the CPU 21 judges that a fixing reload operation that also uses the power supplied from the auxiliary power supply 32 is required to be performed, first, the CPU 21 uses a status flag indicated at Step S2 to confirm whether the power can be supplied from the auxiliary power supply 32 (Step S4). Then, when the status flag is "ON", the CPU 21 starts the power supply from the auxiliary power supply 32 (Step S5). The maximum current setting value MCD of the constant-voltage power supply 30 at this time is a value indicated by a in FIG. 6. Next, the CPU 21 increases maximum power supplied to the fixing heating unit 36 by a fixing power instruction (Step S6*a*) and starts the fixing reload operation (Step S7). When the status flag at Step S4 is "OFF", fixed power is set to a value for a normal (no power supplied from the auxiliary power supply 32) fixing reload (not shown in FIG. 6) (Step S6*b*), and the CPU 21 starts the fixing reload operation.

When judged that the fixing reload is completed by a notification from the fixed power supply 31 or by the fixing temperature being confirmed by a temperature sensor being read (Step S8), the CPU 21 confirms the status flag indicated at Step S2 once again (Step S9). When the status flag is "ON", the CPU 21 instructs the fixed power supply 31 to change the fixed supplied power to printing operation power including power supplied from the auxiliary power supply (B shown in FIG. 6) (Step S10), using a fixed supplied power indicator signal. Then, the CPU 21 changes the maximum current setting value MCD of the constant-voltage power supply 30 to an operation setting value (b shown in FIG. 6) (Step S11). The CPU 21 starts a timer (Step S12). After confirming that a predetermined amount of time has elapsed (Step S13), the CPU 21 changes the fixed supplied power to power set for normal printing (B' in FIG. 6) (step S14) and changes the maximum current setting value MCD to a large value (b'), thereby stopping the power supply from the auxiliary power supply (Step S15). Finally, the CPU 21 returns the status flag that has been set to ON at Step S2 to OFF (Step S16*a*) and completes the power supply control of the auxiliary power supply 32.

When judged that the fixing unit temperature is higher than a predetermined temperature by the temperature detector 70 and that the fixing reload is not required, or when the status flag indicated at Step S2 is "OFF" after the completion of the fixing reload, the CPU 21 changes the fixed supplied power to the power set for normal printing (Step S14*b*) and completes the power supply control.

As described above, according to one aspect of the present invention, after the converting unit that converts the load current to the current detection signal, the first power supply that outputs the constant voltage feeds back the voltage immediately before the load or, in other words, the applied load voltage. The first power supply performs constant-voltage control of the output voltage from the first power supply so that the applied load voltage becomes a constant value. Therefore, the applied load voltage is kept at a constant voltage even when the load current fluctuates because of the fluctuation in the load. The stability of the applied load voltage is high. Even when the current detection resistor is used in the converting unit and voltage drop occurs in the current detection resistor because of the fluctuation in the load current, the applied load voltage is effectively maintained at a constant voltage. The load current detection using the current detection resistor can be actualized at a low cost. Therefore, the increase in the cost of the main power supply incurred to allow an additional establishment of the auxiliary power supply can be suppressed.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power supply unit comprising:

a first power supply of a constant-voltage output to supply a power to a load by using a power supplied from an external source as an input source;

a capacitor for charging a power;

a second power supply of a constant-current output to supply a power to the load based on a control signal by using the power from the capacitor as an input source; and a signal generating unit including a current detector disposed at a position between the load and an output from the first power supply and an output from the second power supply, and a converting unit that converts a load current detected by the current detector flowing in the load into a current signal, wherein the signal generating unit generates the control signal which controls the second power supply to supply the power to the load to compensate for a shortfall of the load current indicated by the generated current signal when the load current exceeds an upper limit of an output current of the first power supply, wherein the first power supply includes a voltage detector which detects a voltage at a position between the current detector and the load which is fed back into a constant-voltage controller of the first power supply which controls an output voltage therefrom and to maintain, at a set value, a voltage of a power supply line that is provided at a position between the load and the current detector.

2. The power supply unit according to claim 1, wherein the signal generating unit includes a current indicator that generates the current signal obtained by subtracting the upper limit of the output current from the load current detected by the current detector, and an output-current control unit that generates the control signal for allowing the second power supply to output a current indicated by the current indicator signal.

3. The power supply unit according to claim 1, wherein the first power supply includes a load-current detecting unit including the current detector.

4. The power supply unit according to claim 1, wherein the first power supply includes the converting unit.

5. The power supply unit according to claim 1, wherein the current detector is a current detection resistor.

6. A power supply unit comprising:

a first power supply of a constant-voltage output to supply a power to a load by using a power supplied from an external source as an input source;

a capacitor for charging a power;

a second power supply of a constant-current output to supply a power to the load based on a control signal by using the power from the capacitor as an input source; and a signal generating unit including a current detector disposed at a position between the load and an output from the first power supply and an output from the second power supply, and a converting unit that converts a load current detected by the current detector flowing in the load into a current signal, wherein the signal generating unit generates the control signal which controls the second power supply to supply the power to the load and to compensate for a shortfall of the load current indicated by the generated current signal when the load current exceeds an upper limit of an output current of the first power supply, wherein the converting unit converts the load current at a stage prior to a loading position for a voltage detector which detects an output voltage at a position between the current detector and the load which is fed back by the first power supply to a constant-voltage controller to control the constant-voltage output into the current signal.

7. The power supply unit according to claim 6, wherein the signal generating unit includes a current indicator that generates the current signal obtained by subtracting the upper limit of the output current from the load current detected by the current detector, and an output-current control unit that generates the control signal for allowing the second power supply to output a current indicated by the current indicator signal.

8. The power supply unit according to claim 6, wherein the first power supply includes a load-current detecting unit including the current detector.

9. The power supply unit according to claim 6, wherein the first power supply includes the converting unit.

10. The power supply unit according to claim 6, wherein the current detector is a current detection resistor.

11. An image forming apparatus comprising:

an image forming unit that forms an image on a recording medium; and a power supply unit that supplies a power to an electrical load of the image forming unit, the power supply unit including a first power supply of a constant-voltage output to supply a power to the load by using a power supplied from an external source as an input source, a capacitor for charging a power;

a second power supply of a constant-current output to supply a power to the load based on a control signal by using the power from the capacitor as an input source; and a signal generating unit including a current detector disposed at a position between the load and an output from the first power supply and an output from the second power supply, and a converting unit that converts a load current detected by the current detector flowing in the load into a current signal, wherein the signal generating unit generates the control signal which controls the second power supply to supply the power to the load and to compensate for a shortfall of the load current indicated by the generated current signal when the load current exceeds an upper limit of an output current of the first power supply, wherein the first power supply includes a voltage detector which detects a voltage at a position between the current detector and the load which is fed back into a constant-voltage controller of the first power supply which controls an output voltage therefrom and to maintain, at a set value, a voltage of a power supply line that is provided at a position between the load and the current detector.

12. The power supply unit according to claim 1, wherein the first power supply supplies a power to a second load and the upper limit of the output current of the first power supply is lowered when the first power supply supplies the power to the second load.

13. The power supply unit according to claim 1, wherein the constant-voltage controller compares the detected voltage with a reference voltage to control the output voltage therefrom and to maintain, at the set value, the voltage of the power supply line.

14. The power supply unit according to claim 1, wherein the external source supplies a constant level of power to the power supply unit, and wherein the external source supplies the power for charging the capacitor.

15. The power supply unit according to claim 1, wherein the voltage detector detects the voltage at the position between the current detector and the load on a supply line such that no additional elements are provided on the supply line between the current detector and the load.

* * * * *